April 27, 1948.  L. A. BENNETT  2,440,629
REVERSIBLE MEAT BLOCK AND SUPPORT STAND
Filed Sept. 19, 1945
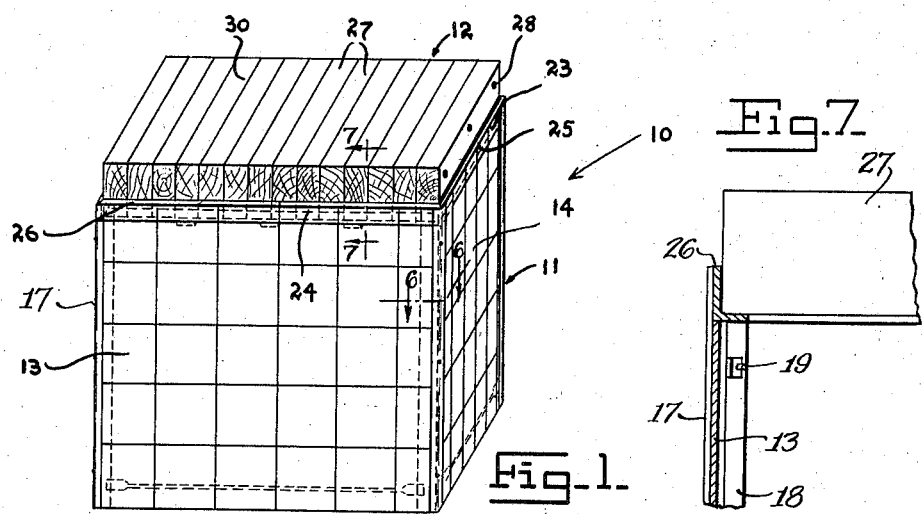
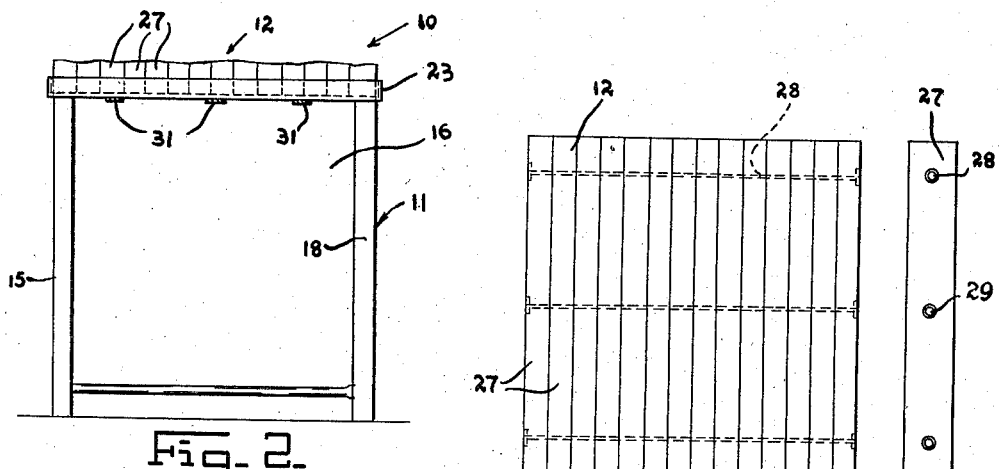
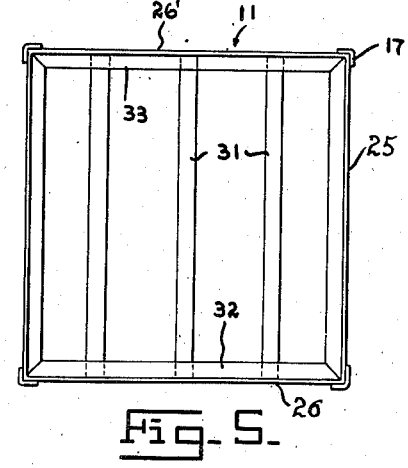
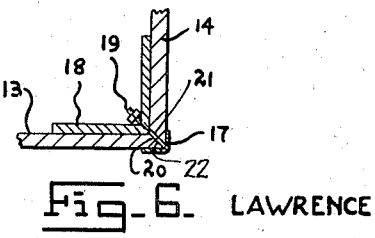
Inventor
LAWRENCE A. BENNETT
By Clarence A. O'Brien
and Harvey B. Jacobson
Attorneys Patented Apr. 27, 1948

2,440,629

UNITED STATES PATENT OFFICE 2,440,629

REVERSIBLE MEAT BLOCK AND SUPPORT STAND

Lawrence A. Bennett, Industrial City, Mo.

Application September 19, 1945, Serial No. 617,310

2 Claims. (Cl. 146—215)

1

My invention relates to butchers' appliances and has for its primary object to provide a stand or meat block or similar chopping block that will securely and efficiently support a meat block in detachable seatment so that the life of the block and its efficiency may be greatly increased.

Another object of the invention is to provide a substantial portable reinforce stand upon which is removably seated a meat chopping block formed of a plurality of complementary members fixedly secured together.

A still further object of this invention is to provide a meat block stand that will enable a meat block or similar chopping or working block of any suitable material to be detachably and securely seated in a seat formed adjacent the top thereof, so that an operator may easily and conveniently, without employment of any foreign tools and with a minimum of manual exertion, reverse the block in the stand so as to present a new cutting surface.

These and ancillary objects are attained by this invention, a preferred embodiment of which is set forth in the following description and illustrated in the accompanying drawings, wherein:

Figure 1 is a perspective view of my improved meat block,

Figure 2 is a side elevation of the device, one wall being removed,

Figure 3 is a detail plan view of a chopping block proper,

Figure 4 is an end elevation thereof,

Figure 5 is a bottom plan view of Figure 1, the block being removed,

Figure 6 is a detail sectional view of a corner of the block stand, and

Figure 7 is a detail sectional view taken on line 7—7 in Figure 1.

In the accompanying drawings as above enumerated and in the following specification like characters indicate like parts throughout and in which 10 indicates my invention which consists of a base 11 and a separable chopping block 12. The base 11 is formed of four walls 13, 14, 15 and 16, the vertical edges of which are held between a pair of angle-irons 17 and 18 at each corner of the stand. As will be noted in Figure 6, the angle-irons 17 and 18 are held together by bolts 19 which project directly through the corners 20 formed by the beveled edges 21 and 22 of the

2 walls 13, 14, etc. Seated upon the upper edges 23, 24, etc., of the said walls and secured by the upper ends of the outer corner angle irons 17 are angle-irons 25, 26, etc., which form a seat for the chopping block 12. The block 12, is formed of a series of members 27 laid on edge and securely bound together by rods or bolts 28, 29, etc. extending therethrough. As this chopping block is loosely seated within the said irons 26, etc., when its upper surface 30 becomes too chopped up as indicated in Figure 2, the block may be reversed and when it is worn too much for further use it may be renewed with a new block. A series of slats 31 seat transversely upon the angles 32 and 33 of the members 26 and 26' and form a base for the said block 12. While the said walls 13, 14, etc., are formed preferably of porcelain or the like, still in less expensive structures they may be made in any material suitable for the purpose.

It is though that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described my invention that which I claim as new and desire to procure by Letters Patent is:

1. A meat block comprising a stand formed by vertically extending spaced inner and outer corner angle irons, vertical side walls for said stand having bevelled ends disposed between said spaced corner angle irons with their inner and outer surfaces respectively contacting said inner and outer angle irons, clamping bolts projected through the bevelled edges and adjustably connecting adjacent corner angle irons, a block supporting seat formed by interconnected side angle irons supported on the upper ends of said side walls and secured within the upper ends of said outer corner angle irons, and a reversible chopping block supported in said block supporting seat.

2. A meat block comprising a stand formed by vertically extending spaced inner and outer corner angle irons, vertical side walls for said stand having bevelled ends disposed between said spaced corner angle irons with their inner and outer surfaces respectively contacting said inner and outer angle irons, clamping bolts projected through the bevelled edges and adjustably connecting adjacent corner angle irons, a block supporting seat formed by interconnected side angle irons supported on the upper end of said side walls and secured within the upper ends of said outer corner angle irons, a reversible chopping block supported in said block supporting seat, and spaced slats secured to and extending transversely of said block supporting seat.

LAWRENCE A. BENNETT.

REFERENCES CITED

The following references are of record in the file of this patent:

UNITED STATES PATENTS

| Number | Name | Date |
|---|---|---|
| 389,486 | Schraudner | Sept. 11, 1888 |
| 486,844 | Austin | Nov. 29, 1892 |
| 760,974 | Dyarman | May 24, 1904 |
| 839,169 | Mansfield | Dec. 25, 1906 |
| 1,323,915 | Schmitt | Dec. 2, 1919 |
| 1,481,030 | Schickerling | Jan. 15, 1924 |
| 1,667,913 | Weston | May 1, 1928 |
| 1,734,853 | Gurnea | Nov. 5, 1929 |
| 2,199,917 | Janes | May 7, 1940 |
| 2,310,904 | Bales | Feb. 9, 1943 |